United States Patent [19]

Ando et al.

[11] Patent Number: 4,618,019
[45] Date of Patent: Oct. 21, 1986

[54] MOTORCYCLE

[75] Inventors: Junji Ando, Tokyo; Yoshihisa Hirose, Asaka, both of Japan

[73] Assignee: Honda Giken Kogyo Kabushiki Kaisha, Tokyo, Japan

[21] Appl. No.: 692,440

[22] Filed: Jan. 17, 1985

[30] Foreign Application Priority Data

Feb. 17, 1984 [JP] Japan ................................ 59-28205
Feb. 17, 1984 [JP] Japan ................................ 59-28206
Feb. 17, 1984 [JP] Japan ................................ 59-28207
Feb. 17, 1984 [JP] Japan ................................ 59-28208

[51] Int. Cl.⁴ ........................................... B62K 11/00
[52] U.S. Cl. ................................ 180/219; 180/53.5
[58] Field of Search ............ 180/219, 230, 229, 65.4, 180/53.5; 123/179 D, 179 E

[56] References Cited

U.S. PATENT DOCUMENTS

| | | | |
|---|---|---|---|
| 2,606,624 | 8/1952 | Chiotte | 180/53.5 |
| 2,860,717 | 11/1958 | Jebrzykowski | 180/53.5 |
| 3,866,701 | 2/1975 | Bekker | 180/53.5 |
| 4,476,951 | 10/1984 | Ito | 123/179 E |

FOREIGN PATENT DOCUMENTS 0000243 5/1979 PCT Int'l Appl. ................. 180/219

Primary Examiner—John J. Love
Assistant Examiner—Mark C. Dukes
Attorney, Agent, or Firm—Armstrong, Nikaido, Marmelstein & Kubovcik

[57] ABSTRACT

A motorcycle having an engine with a built-in dynamo therein is provided with a second dynamo in addition to the first dynamo. This second dynamo is used for purposes other than that for the driving of a vehicle. This second dynamo is installed outside of the engine and driven by the engine through a belt transmission device. Provision is made to establish a driving relation between the second dynamo and the engine, or to disconnect such relation.

The belt transmission device is covered with a cover having an air inlet port, a cooling fan is mounted on a rotor shaft of the second dynamo, and the belt transmission device is compulsorily cooled by air flowing from the air inlet port to the second dynamo.

A socket for taking off the output of the second dynamo is provided on the vehicle body.

The motorcycle includes a vehicle body having a main frame and a lower frame extending in a generally parallel relation with respect to each other. The engine is supported on the lower frame. The second dynamo is positioned in a space above this engine and under the main frame.

4 Claims, 25 Drawing Figures

MOTORCYCLE

BACKGROUND OF THE INVENTION

This invention relates to a motorcycle (including motortricycle) which is equipped with a second dynamo in addition to a usual dynamo.

Motorcycles in the art are generally equipped with various kinds of electric equipment such as ones belonging to the starting and igniting systems of the engine, and devices for lighting. Such conventional motorcycles are equipped with a battery and dynamo as a power source for such electric equipment. In general, such a dynamo is small in size and is built-in within engine, and its rotor is directly connected to a crankshaft of engine.

By the way, the output of such a dynamo is frequently desired to be used for other purposes than the driving of a vehicle, such as for electric tools and for lighting for camping in a remote place. To this end, however, a large dynamo is required. If such a large dynamo is built-in, the engine itself is required to be large. Since motorcycles are limited in space for the engine, it is difficult to install such a large engine.

The present invention is accomplished under the above mentioned technical background.

SUMMARY OF THE INVENTION

It is therefore a primary object of the present invention to provide a motorcycle, wherein a second dynamo adapted to use for other purposes than the driving of a vehicle is installed outside of engine.

Another object of the invention is to provide a motorcycle, wherein said second dynamo can be drivingly connected to and disconnected from said engine in accordance with necessity.

A further object of the invention is to provide a motorcycle, wherein the second dynamo and the drivingly connecting portion between said second dynamo and engine can be effectively cooled.

Still a further object of the invention is to provide a motorcycle, wherein the output of the second dynamo can be conveniently taken off.

An even further object of the invention is to provide a motorcycle, wherein the second dynamo is installed in a position where the driver will not be adversely affected in his normally sitting state.

In order to obtain the above objects, a motorcycle according to the present invention includes a second dynamo installed outside of the engine in addition to a first dynamo built-in within said engine, a driven shaft connected to said second dynamo, a driven rotary member mounted on said driven shaft in such a manner as to be relatively rotatable, a driving rotary member provided in said engine and adapted to drive said driven rotary member, a connecting member mounted on said driven shaft in such a manner as to be slidable in the axial direction but relatively unrotatable, said connecting member being adapted to be engaged with and disengaged from said driven rotary member, and an actuating member connected to said connecting member through a bearing, said actuating member being displacable in the axial direction of said driven shaft, but unrotatable, said connecting member being engaged with or disengaged from said driven rotary member in accordance with displacement of said actuating member in said axial direction.

From one aspect of the present invention, the driven rotary member and the driving rotary member are connected each other by means of a belt transmission device. There is provided a cover adapted to cover said belt transmission device. Cooling air is sent into the inside of said cover by a cooling fan mounted on a rotor shaft of said second dynamo through an air inlet port provided on said cover.

From another aspect of the present invention, a socket adapted to take off the output of the second dynamo is provided at the body of the motorcycle.

From still a further aspect of the present invention, the motorcycle has a main frame and a lower frame extending fore and aft in a generally parallel relation with respect to each other. An engine is carried on said lower frame, and the second dynamo is positioned in a clearance formed above of said engine and underneath the main frame.

The above and other objects and features of the present invention will become manifest to those versed in the art upon making reference to the following detailed description as well as the accompanying sheet of drawings.

DETAILED DESCRIPTION OF THE EMBODIMENTS

Figure 1:
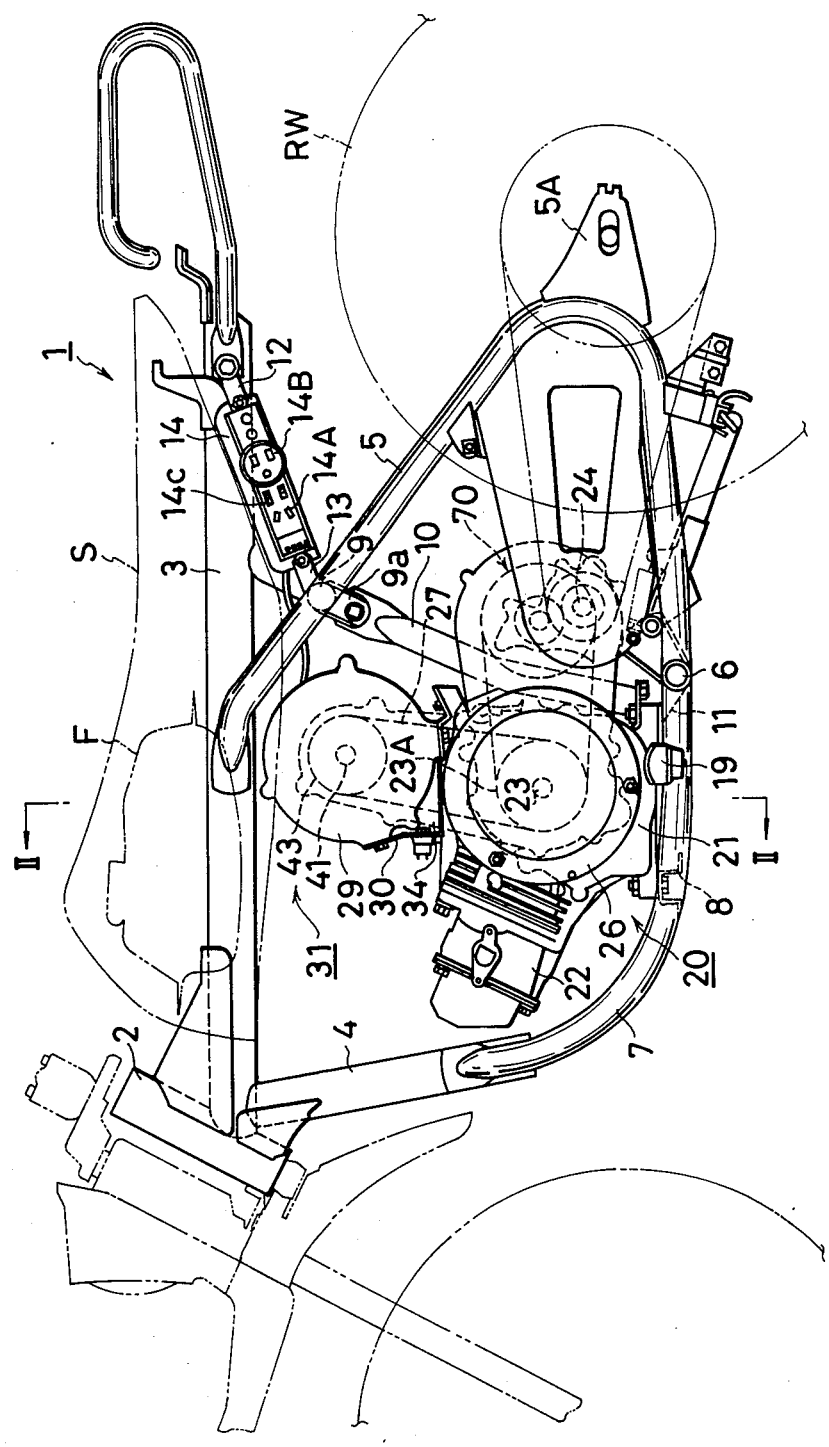
FIG. 1 is a side view of a motorcycle according to one embodiment of the present invention.

FIG. 1 illustrates a left side view of a motorcycle 1 incorporated with the present invention and schematically showing a positional relation between the frame structure of the vehicle body and the other members including an engine 20. The body frame comprises a head pipe 2; a main pipe 3 connected to said head pipe 2, on the upper portion of which a fuel tank F and a seat S are placed, a down tube 4 connected to the main pipe 3 and the head pipe 2 and hanging down in front of the engine 20, a pair of right and left rear pipes 5 connected at the upper ends to said main pipe 3 and at the lower ends to a lower cross pipe 6, and curved toward a rear wheel RW side; and a pair of right and left bottom pipes 7 connected at the both ends to the down tube 4 and the lower cross pipe 6. A cross plate 8 is bridged over between said pair of bottom pipes 7, and the engine 20 is carried on said cross plate 8. The pair of rear pipes 5 are connected with respect to each other at the upper portions by means of an upper cross pipe 9. A joint stay 9a is connected to a generally central portion of said upper cross pipe 9. A pair of right and left reinforcing pipes 10 are disposed between the joint stay 9a and engine 20 for connection.

Since the rear wheel RW of said motorcycle 1 has a low pressured tire, a rear cushion is not provided. The axle of said rear wheel RW is carried by bearing members 5a provided at the curved rear portions of said pair of rear pipes 5, respectively.

The engine 20 is fastened tight at its front lower portion to the cross plate 8 and at its rear lower portion to a stay 11 mounted on the lower cross pipe 6. As is apparent from FIG. 2, a dynamo 25 (a first dynamo) covered with a left cover 26 is mounted to one end portion of a crank shaft 23 of the engine 20 as in the case with a conventional engine. This motorcycle according to the present invention is installed with a second dynamo (alternator) 31 in addition to said first dynamo 25. Said second dynamo 31 is positioned at an upper portion above the center line L of the crank shaft in a generally mid position intermediate a cylinder head 22 and a power transmission shaft 24 adapted to transmit power to the rear wheel RW. Since the engine 20 is disposed in the forward and backward direction along the bottom pipe 7 and the rear pipe 5, with its cylinder disposed in its forward position and with the speed change gear disposed in its backward position, the engine 20 and the second dynamo 31 mounted thereupon are positioned in a space surrounded by the main pipe 3, down tube 4, rear pipe 5 and bottom pipe 7 when viewed from a side direction of the body of the motorcycle.

A stator 32 of the second dynamo 31 is sandwiched between a right bracket 28 which is formed by extending a transmission case 21b integrally connected to a crank case 21a upward and a left bracket 29 carried by the crank case 21A through a supporting member 30, and held stationary by means of a screw. One end of a rotor shaft 33 of the second dynamo 31 is carried by the left bracket 29 through a bearing, while the other end thereof is coaxially connected to one end of a driven shaft 41. The driven shaft 41 is carried by the right bracket through a bearing, thereby constituting a part of a driving device 40 for the second dynamo. The driving device 40 for the second dynamo will be described in detail later.

Figure 2:
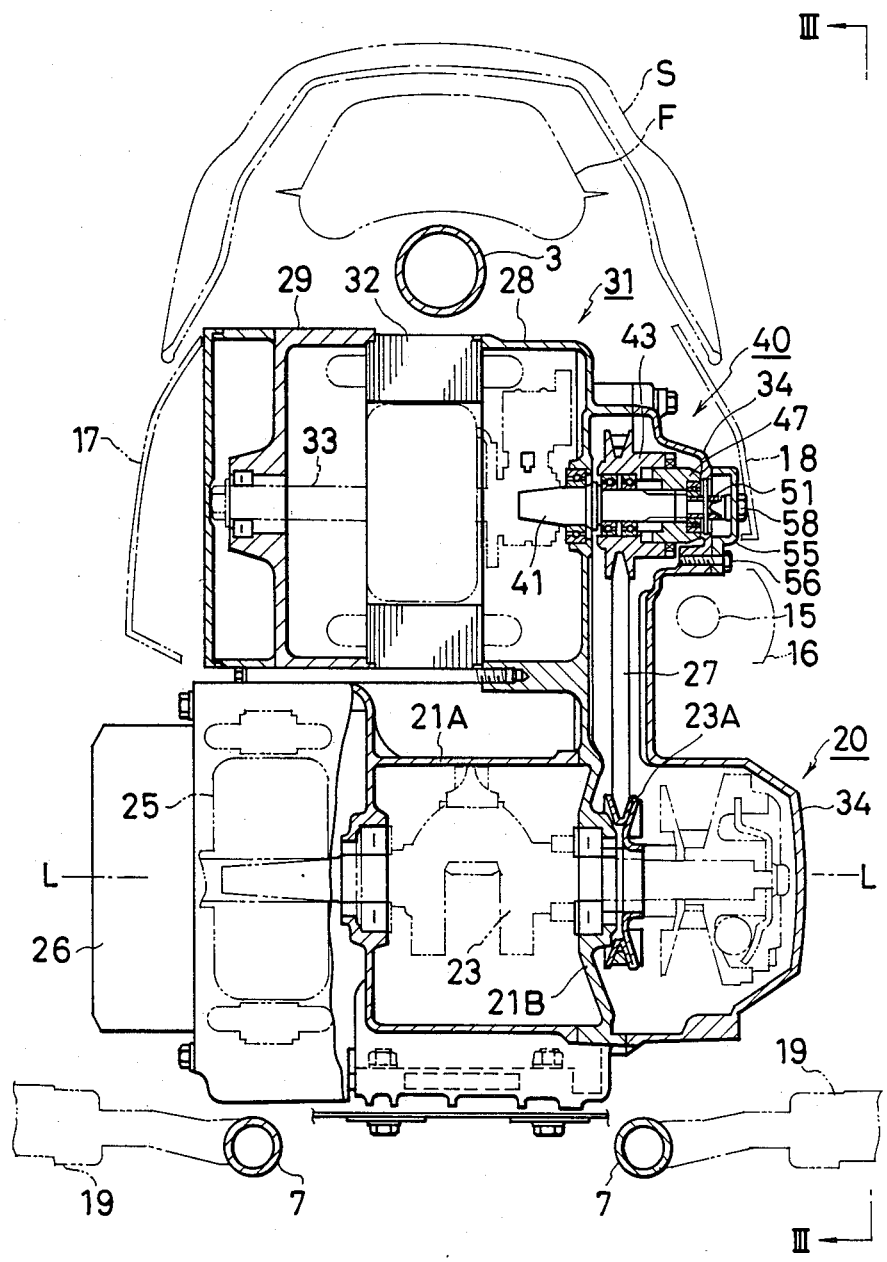
FIG. 2 is a sectional view taken along line II—II of FIG. 1.
Figure 3:
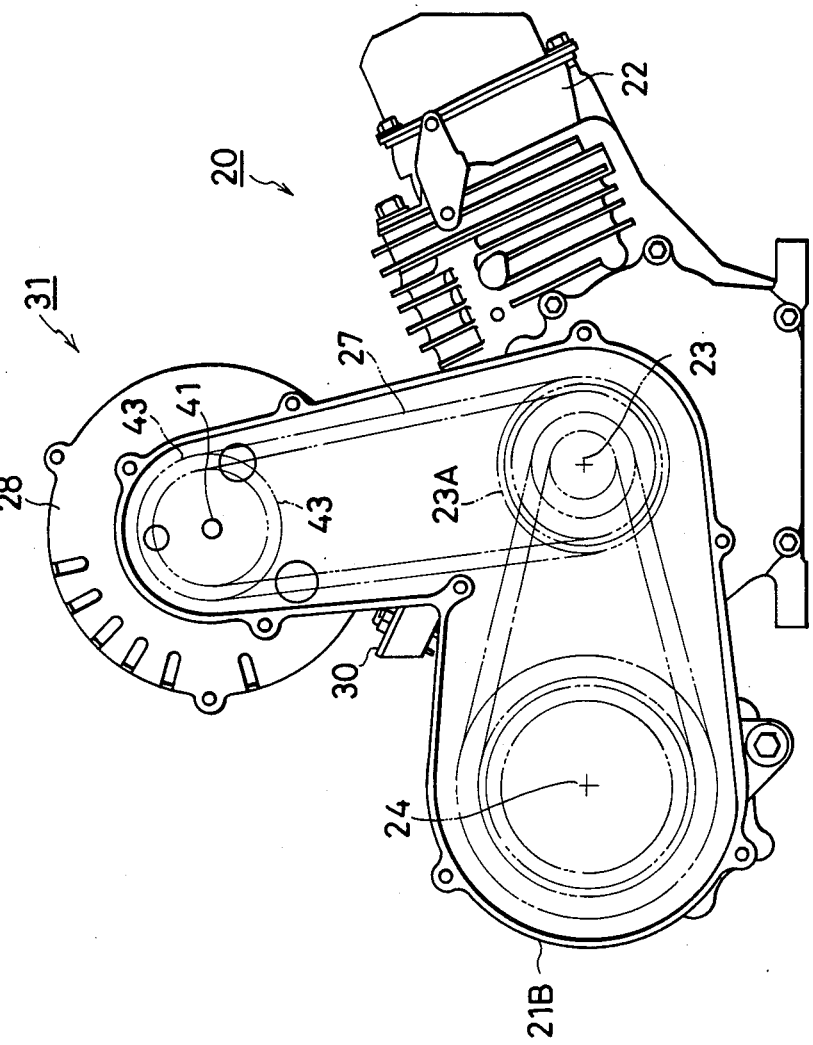
FIG. 3 is a partial side view of FIG. 2 when viewed from the direction as shown by arrows III—III.

The second dynamo 31 is positioned beneath a seat S, a fuel tank F and the main pipe 3, and covered with right and left side covers 17 and 18 (FIG. 2). In the figure, 15 denotes an exhaust pipe, 16 denotes its protector, and 19 denotes a step (foot step).

The socket board 14 is supported by a stay 12 fixed to the foremost end of a cross pipe projecting from the main pipe 3 and another stay 13 mounted on the rear pipe 5. Said socket board 14 is provided with a direct current socket 14A and an alternating current socket 14B. The output of the second dynamo 31 can be taken off from these sockets 14A and 14B. Since the second dynamo 31 is an alternating current dynamo, a rectifier is required in order to obtain a direct current. To this end, an AC and DC switch 14C is provided on the socket board 14.

Nextly, referring to FIG. 2, and FIG. 4 through FIG. 8, the driving device 40 will be described.

A driven pulley (driven rotary member) 43 is fitted to a driven shaft 41 at the outside of the right bracket 28 through a pair of bearings 42. A driving belt (belt driving device) 27 is stretched between said driven pulley 43 and a driving pulley (driving rotary member) 23A fitted to and rotating with the crank shaft 23. The driven shaft 41 is formed at its free end portion with a spline 41a. A connecting member 47 which is formed at its internal face with a spline groove 48 is fitted to said free end portion. Said connecting member 47 is biased toward the right direction by a compression spring 46.

The internal diameter of the driven pulley 42 is large at the connecting member 47 side, and this large diameter portion 44 is formed at its end wall with a plurality of recesses 45 at equal spaces in the circumferential direction.

Figure 5:
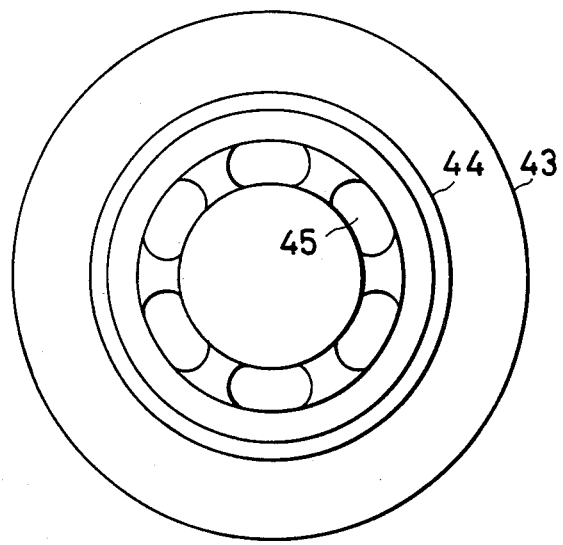
FIG. 5 and FIG. 6 are end views of a part of FIG. 4 when viewed from the direction as shown by arrows V—V and VI—VI, respectively.
Figure 6:
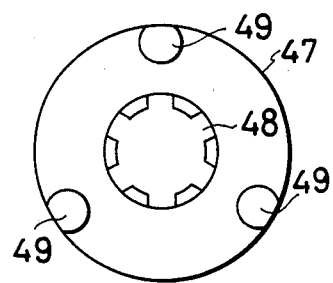

On the other hand, the connecting member 47 is formed at its internal end face with a plurality of knobs 49 at equal spaces in the circumferential direction (FIG. 5 and FIG. 6).

The connecting member 47 is fitted at its external end portion with an actuating member 51 through a bearing 50. Said actuating member 51 is formed in a sleeve shape and projected outward through an opening 35 formed in the right cover 34 adapted to cover the transmission case 21B, the right bracket 28 and the driving device 40. The actuating member 51 is provided at its external end portion with a spring pin 54 penetrating therethrough in the diametric direction. The both ends of said spring pin 54 are engaged in two grooves 36 formed in said opening 35 in such a manner as to be diametrically opposite with respect to each other. Consequently, the actuating member 51 is displacable in the axial direction but unrotatable. The actuating member 51 is formed at its external end face with two pairs of cuts in the axial direction. These cuts 52 and 53 are spacedly formed at every 90° with respect to each other. The depth of the cut 52 is deep but that of the other cut 53 is shallow. The angle $\theta$ of the deep cut 52 is preferably 90° or more.

The opening 35 is covered with a cover 55 secured to the right cover 34 by means of a bolt 56. A dust proofing gasket 57 is interposed between the cover 55 and the right cover 34. The cover 55 is formed at its central portion with an opening 55A. A shift bolt 58 permitted to penetrate through said opening 55A is rotatably mounted to the cover 55. The shift bolt 58 is held tight by a clip 59 so that it will not come off.

Figure 4:
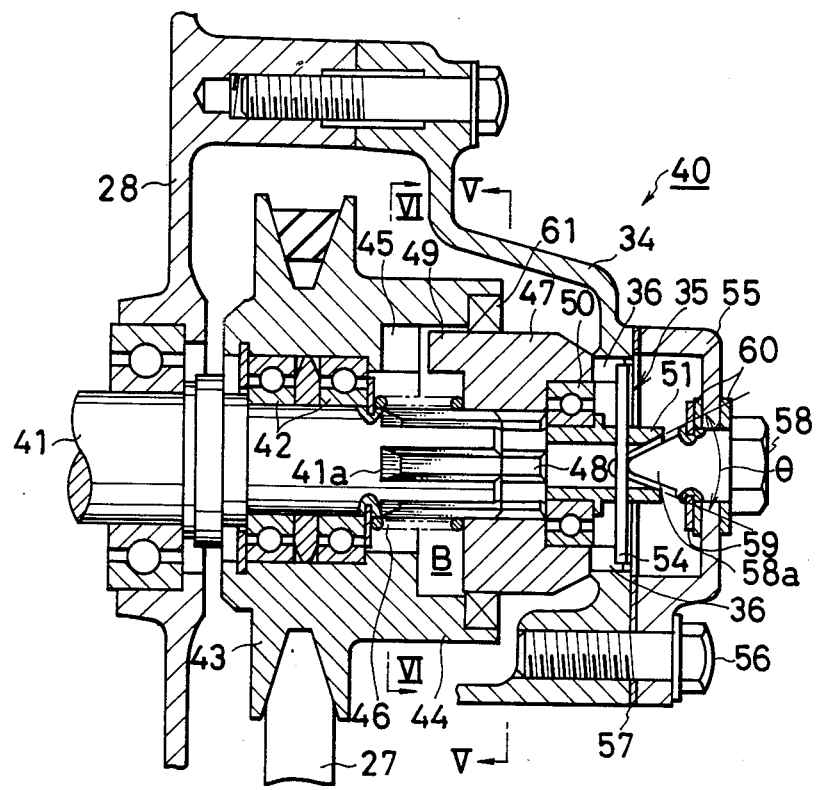
FIG. 4 is an enlarged view of a material portion of FIG. 2.
Figure 7:
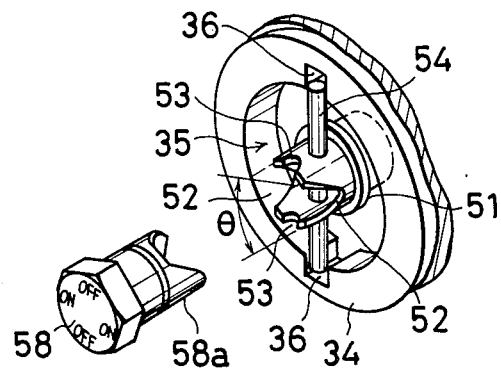
FIG. 7 and FIG. 8 are exploded perspective views of a portion of a driving device for a second dynamo.
Figure 8:
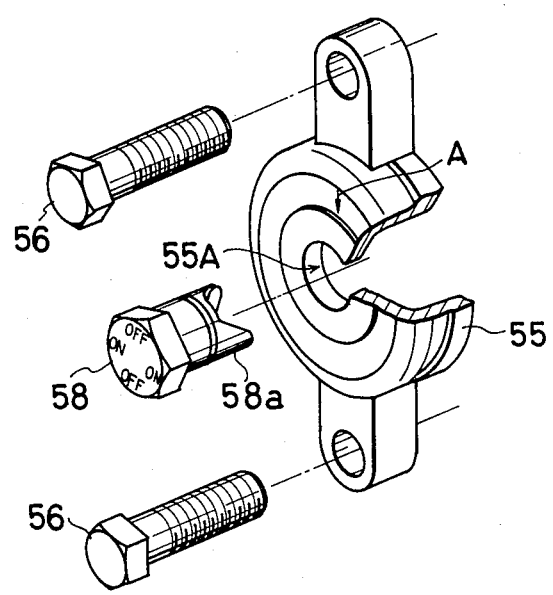

The shift bolt 58 is, as shown in FIG. 7 and FIG. 8, formed at its foremost end portion in a fork shape. This fork-shaped portion 58a is formed in such a configuration as to be generally in agreement with the deep cut 52 formed in the actuating member 51, as shown in FIG. 4. At the same time, the foremost end of said fork-shaped portion 58a is designed so as to be in agreement with the shallow cut 53. Also, the shift bolt 58 is provided at its top face with "ON" and "OFF" indications, as shown in FIG. 7. On the other hand, the cover 55 is provided at its external face with an arrow A sign, as shown in FIG. 8.

When the shift bolt 58 is brought to be in the OFF position where said "OFF" indication is in agreement with the arrow A, the fork-shaped portion 58a of the shift bolt 58 is caused to be engaged in the deep cut 52 formed in the actuating member 51. As a result, the connecting member 47 biased by the compression spring 46 is brought to be out of engagement with the driven pulley 43. In this state, even if the driven pulley 43 is rotated, the driven shaft 41 will not be rotated. As a result, the second dynamo 31 will not be rotated either.

In order to take off the output of the second dynamo 31, while maintaining the engine 29 in its stopped state, the shift bolt 58 is rotated and brought to be in the ON position. In other words, the shift bolt 58 is brought to be in a position where said "ON" indication is in agreement with the arrow A. Due to the foregoing operation, the foremost end of the fork-shaped portion 58A engaged in the deep cut 52 of the actuating member 51 is engaged in the shallow cut 53 by propelling the actuating member 51 in the left direction (FIG. 4). At this time, the turning force is applied to the actuating member 51. However, since the spring pin 54 is engaged at its both ends in a retaining groove 36 formed in the right cover 34, the actuating member 51 will not be rotated.

When the actuating member 51 is moved in the left direction in this way, the connecting member 47 is urged toward the same direction through the bearing 50. And the connecting member 48 is propelled, against the biasing force of the compression spring 46, toward the left direction along the spline 41a. As a result, the knobs 49 formed on the connecting member 48 are caused to engage in the recesses 45 of the driven pulley 43. At this moment, the driven pulley 43 is already integrated with the driven shaft 41 through the connecting member 47. Therefore, when the engine 20 is started, the turning force of the crank shaft 23 is transmitted to the driven shaft 41 through the driving belt 27, the driven pulley 43 and the connecting member 47. As a result, the rotor shaft 33 integrally connected to said driven shaft 41 is driven and rotated together with the driven shaft 41. In this way, the output of the second dynamo 31 can be taken off for use through the socket board 14.

In order to bring the second dynamo 31 in a non-use state, after stopping the engine 20, the shift bolt 58 is rotated until it is brought to be in the OFF position.

Although the second dynamo driving device 40 is not wet by lubricating oil, unlike a speed change gear which is integrated with the engine 20, since the bearing 50 is interposed between the rotatable connecting member 47 and the stationary actuating member 51, there is no worry about the arising of seizure between said members 47 and 51.

Furthermore, a clearance B (FIG. 4) formed between the driven pulley 43 and the connecting member 47 is filled with grease in order to prevent the friction between the members 43 and 47. An oil seal 61 is adapted to prevent the leakage of grease.

Figure 9:
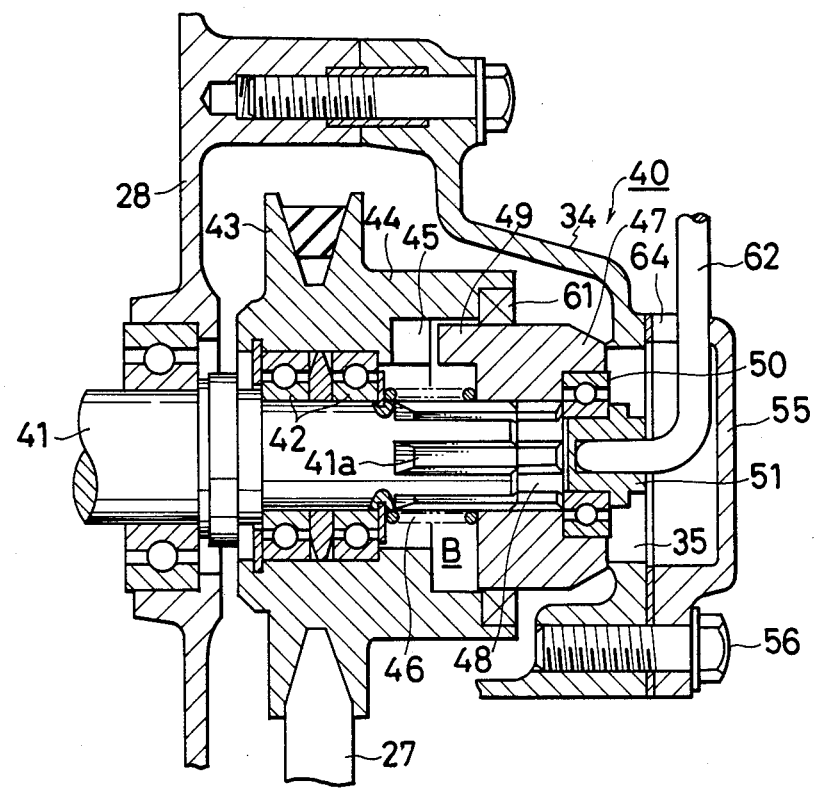
FIG. 9 is a sectional view like FIG. 4 but showing another embodiment.

FIG. 9 illustrates a sectional view like FIG. 4 showing the second dynamo driving device 40 according to another embodiment of the present invention, wherein like numerals denote like or corresponding parts with respect to the above embodiment.

Figure 10:
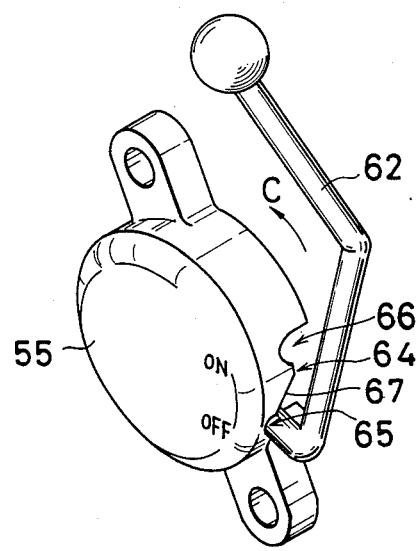
FIG. 10 is a perspective view of a portion of a driving device for a second dynamo in this embodiment.
Figure 11:
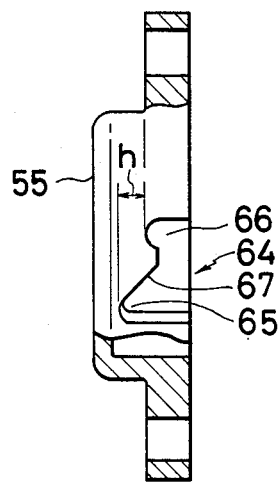
FIG. 11 is a side view, partly in section, of a cover member in the above driving device.

In this embodiment, an actuating member 51 receives an actuating rod 62. Said actuating rod 62 is permitted to penetrate through the cut 64 formed in the peripheral wall of a cover 55 and extended outward. Said cut 64 includes, as shown in FIG. 10 and FIG. 11, a deep first position cut out 65, a shallow second position cut out 66, and an inclined cam face 67. As shown in FIG. 10, the cover 55 is provided at its external surface with an "OFF" indication corresponding to the first position 65 and with an "ON" indication corresponding to the second position 66.

When the actuating rod 62 is in the first position (OFF position), the actuating member 51 and the connecting member 47 occupies the right position as shown in FIG. 9. And a knob 49 formed on the connecting member 47 is out of engagement with a recess 45 formed in a driven pulley 43. The actuating rod 62 is urged against the first position 65 by means of a compression spring 46.

In order to take off the output of a second dynamo 31 for use, while maintaining an engine 20 in its stopped state, the operation rod 62 is moved in the direction as shown by an arrow C in FIG. 10 along the cam face 67 for setting in the second position 66 (ON position). Due to the foregoing operation, the actuating rod 62, actuating member 51 and connecting member 47 are displaced for a stroke "h" (FIG. 11) in the left direction in FIG. 9. As a result, the knob 49 of the connecting member 47 is caused to engage in the recess 45 of the driven pulley 43. With this state, when the engine 20 is started, the turning force of the crank shaft 23 is transmitted to the driven shaft 41 through the driving belt 27, driven pulley 43 and connecting member 47. As a result, the rotor shaft 33 integrally connected to the driven shaft 41 is driven for rotation.

Figure 12:
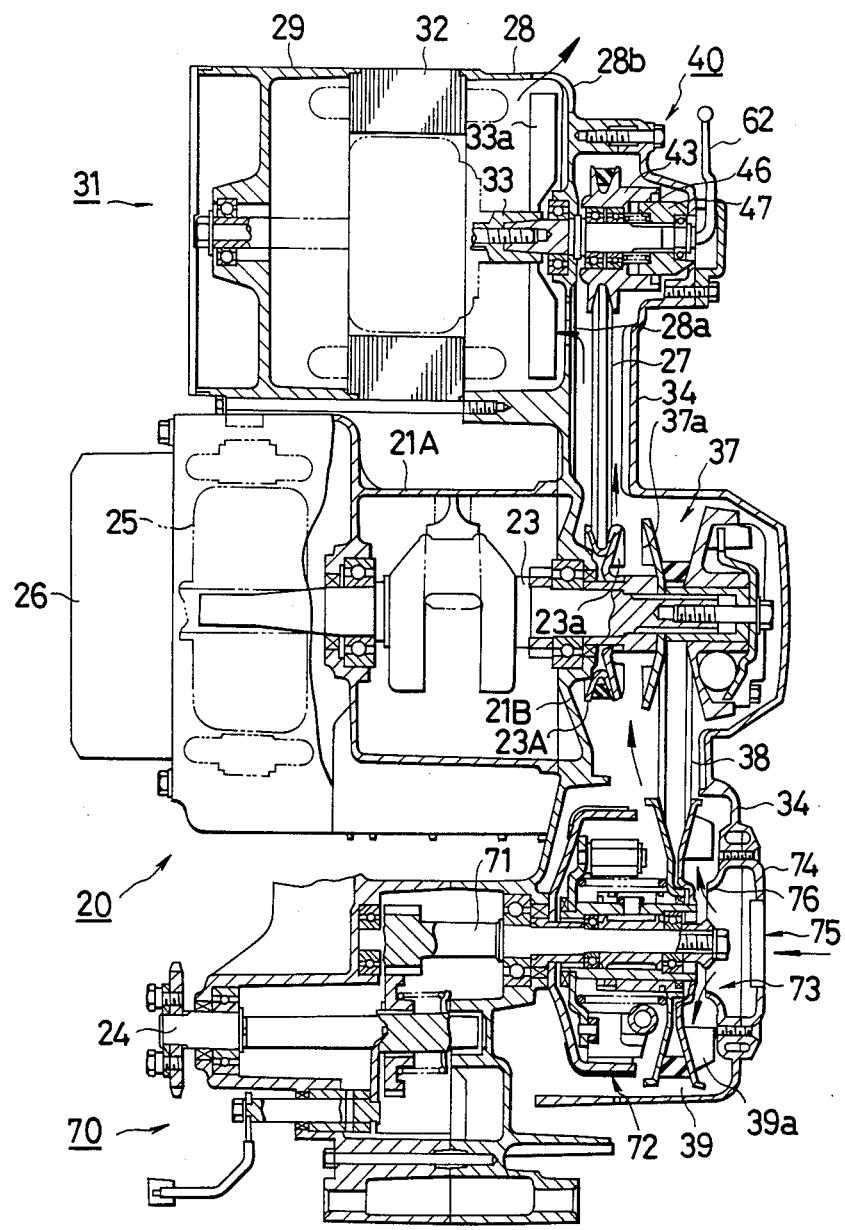
FIG. 12 is a sectional view like FIG. 2 but showing another embodiment.
Figure 13:
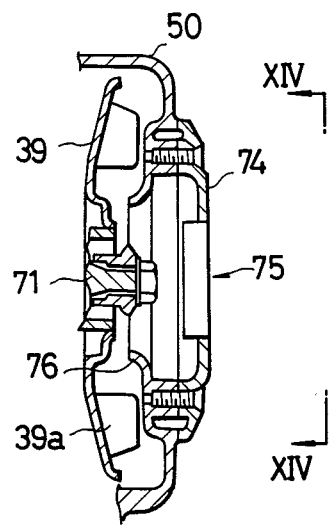
FIG. 13 is an enlarged view of a portion of FIG. 12.
Figure 14:
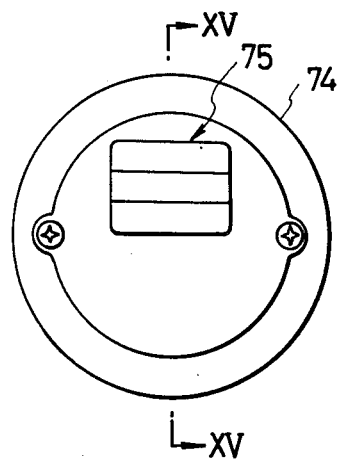
FIG. 14 is a front view of FIG. 13 when viewed from the direction as shown by arrows XIV—XIV.
Figure 15:
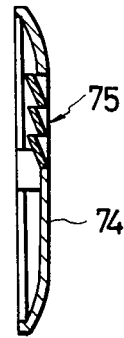
FIG. 15 is a sectional view taken along line XV—XV of FIG. 14.

FIG. 12 illustrates a further embodiment of the present invention. In FIG. 12, a change speed gear 70 integrally mounted to the engine 20 is shown. This change speed gear 70 is, as shown in FIG. 1, provided in a backward position of the engine 20, but it is shown in a space beneath the engine 20 in FIG. 12 in order to show the figure clearly.

The change speed gear 70 is provided with a main shaft 71 which is permitted to penetrate through the transmission case 21B. Said main shaft 71 is provided at its end portion with a driven pulley 39. And a V-belt 38 is stretched between said driven pulley 39 and a driving pulley 37 mounted to the end portion of the crank shaft 23. 72 denotes an automatically operated centrifugal clutch. These transmission mechanisms are known as belt transmission type automatic change speed gear mechanisms.

The right cover 34 is adapted to cover the second dynamo driving belt transmission devices 23A, 27 and 43 as well as the belt transmission devices 37, 38 and 39 for power transmission. Said cover 34 is formed at its portion outside of the driven pulley 39 with a window 73. A suction cover 74 adapted to cover the window 73 is secured to the cover 34 by means of a screw. Said suction cover 74 is formed with a louver 75 for taking air therein. Said window 73 is formed at its periphery with a shroud 76 extending to the inner side of a fan blade 39A provided on the driven pulley 39 with respect to its radial direction.

Likewise, the driving pulleys 37 and 23A are provided with fan blades 37a and 23a similar to said fan blade 39a. The right bracket 28 is formed with a plurality of communication ports 28a and a plurality of discharge ports 28b. Also, a fan blade 33a is mounted to one end portion of the rotor shaft 33 in the close vicinity of the internal face of the right bracket 28.

When the engine 20 is rotated, due to the function of the fan blades 39a, 37a and 23a which rotate together with the engine 20, outside air enters into the inside of the cover 34 through the window 73. While cooling the V-belt 38 and the driving belt 27, the outside air flows along the inner side of the cover 34, enters into the internal portion of the second dynamo 31 through the communication port 28a, and is discharged outside through the discharge port 28b. During the operation of the second dynamo 31, the second dynamo 31 is also cooled by the fan blade 33a. Consequently, said two belt transmission portions 37, 38 and 39;23A, 27 and 43 as well as said second dynamo 31 can be effectively cooled by means of only one cooling system. In addition, since the shroud 76 is extending to the internal side of the fan blade 39a with respect to its radial direction, a sufficient low pressure is produced at the internal side of the fan blade 39a. As a result, a sufficient amount of air flows into the inside of the cover 34 to perform effective cooling.

Figure 16:
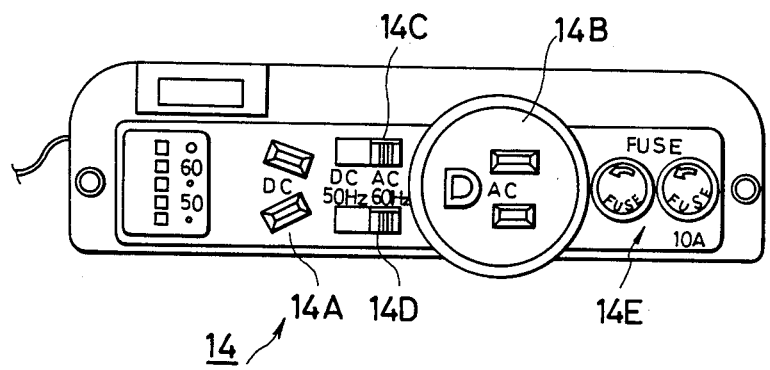
FIG. 16 is a front view of a socket board.

FIG. 16 illustrates an enlarged view of the socket board 14 in FIG. 1. Since the direct current socket 14A, alternating current sockets 14B, and AC and DC switch 14 were already described, duplicate description will be avoided. Said socket board 14 is additionally provided with a frequency switch 14D, a fuse 14E, etc.

Figure 17:
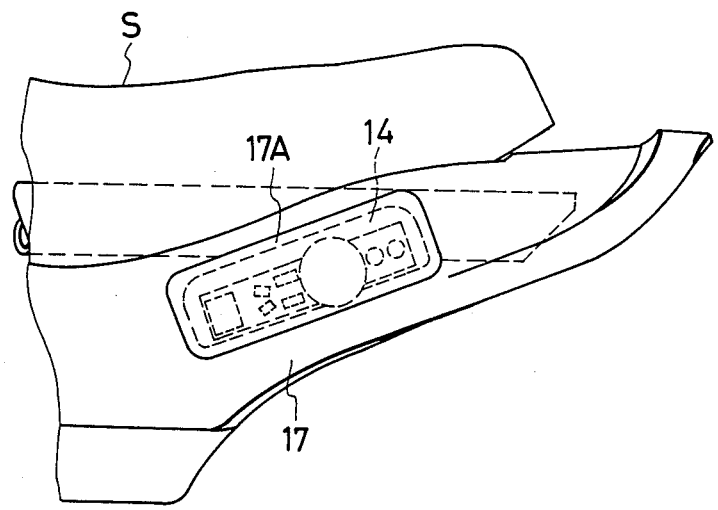
FIG. 17 is a side view showing one example of positional relation of the socket board when applied to the body of the motorcycle.
Figure 18:
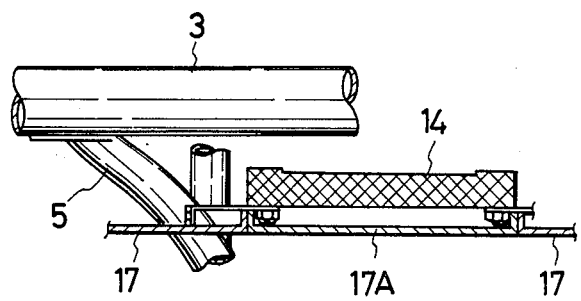
FIG. 18 is a sectional view of the above.

FIG. 17 and FIG. 18 illustrate one example of said socket board 14 mounted to a portion beneath the main pipe 3 at the inner side of the left side cover 17. The left side cover 17 is formed with a window in a position corresponding to the socket board 14. Said window is covered with a detachable socket board cover 17A. When necessary, the output of the second dynamo 31 can be taken off from the socket board 14 by removing the socket board cover 17A from the side cover 17. For convenient use purpose, the socket board 14 may be arranged at both sides of the motorcycle body.

Figure 19:
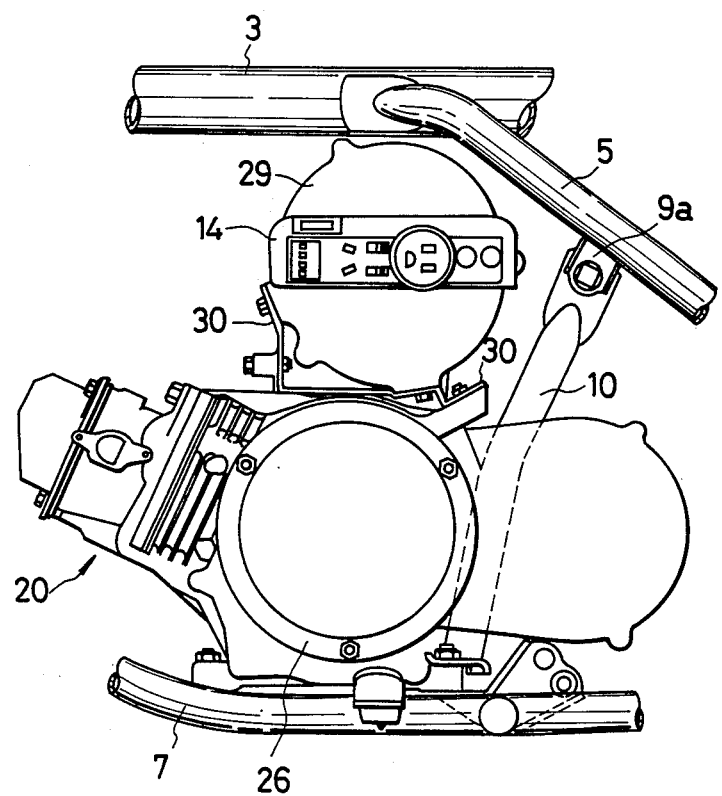
FIG. 19 is a side view showing another example of positional relation of the socket board.

FIG. 19 illustrates one example showing the socket board 14 mounted to the motorcycle body frame at the side of said second dynamo 31.

Figure 20:
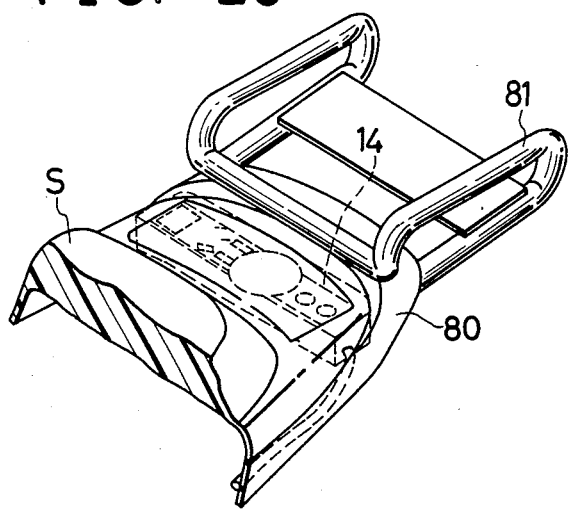
FIG. 20 and FIG. 21 are a perspective view and a side view showing a still further example of positional relation of the socket board.
Figure 21:
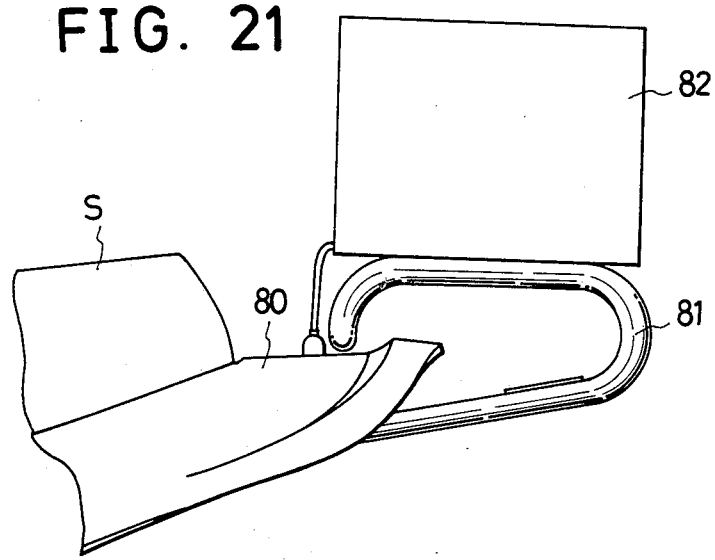

In another example shown in FIG. 20, a rear cowl 80 is formed at its upper face with a window in a backward position of the seat S, and the socket board 14 is disposed at said position. With this arrangement, it is convenient when it is used in such a manner as to put an electric appliance 82 (for example, a hot-water heater, an oven, etc.) on the rear carrier 81, as shown in FIG. 21.

Figure 22:
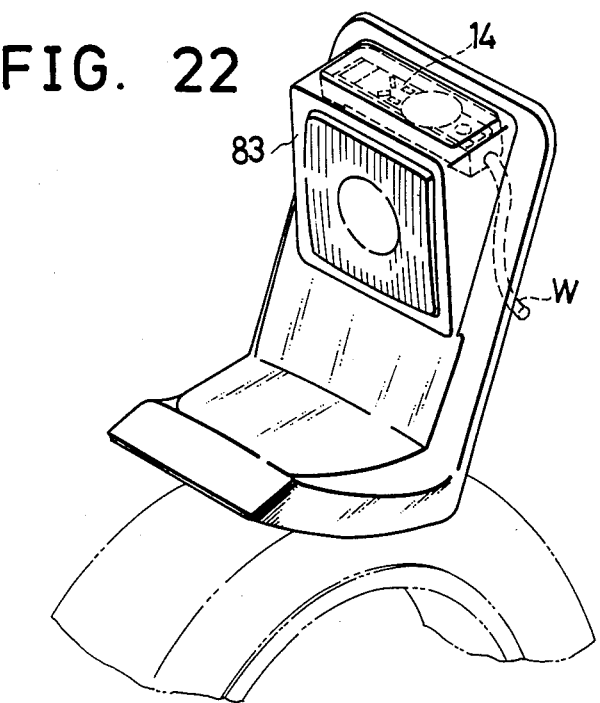
FIG. 22 and FIG. 23 are perspective views showing an even further example of positional relation of the socket board.
Figure 23:
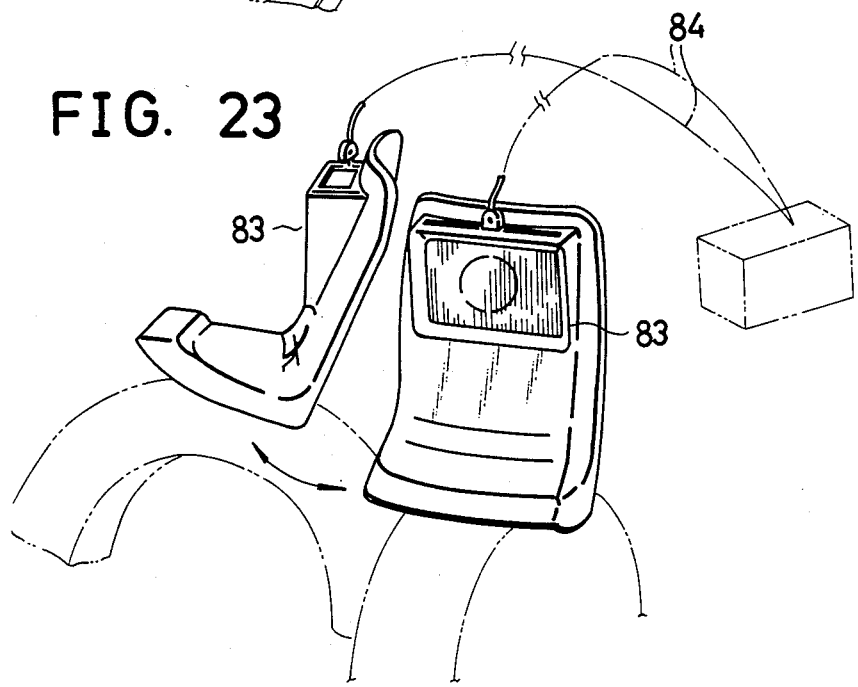

FIG. 22 illustrates an example of the socket board 14 mounted to the top face of the headlight device 83. As shown in FIG. 23, the position of the socket board 14 can be easily moved by controlling a handle. In this way, wire (electric wire) 84 can be handled with ease.

Figure 24:
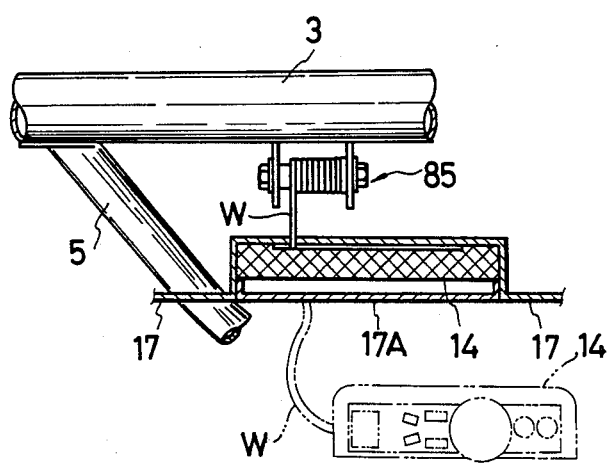
FIG. 24 is a sectional view like FIG. 20 but showing an additional example of positional relation of the socket board.

In FIG. 24, output lead W extending from the second dynamo 31 is connected to the socket board 14 through a reel 85 so that the socket board 15 can be freely taken off.

Figure 25:
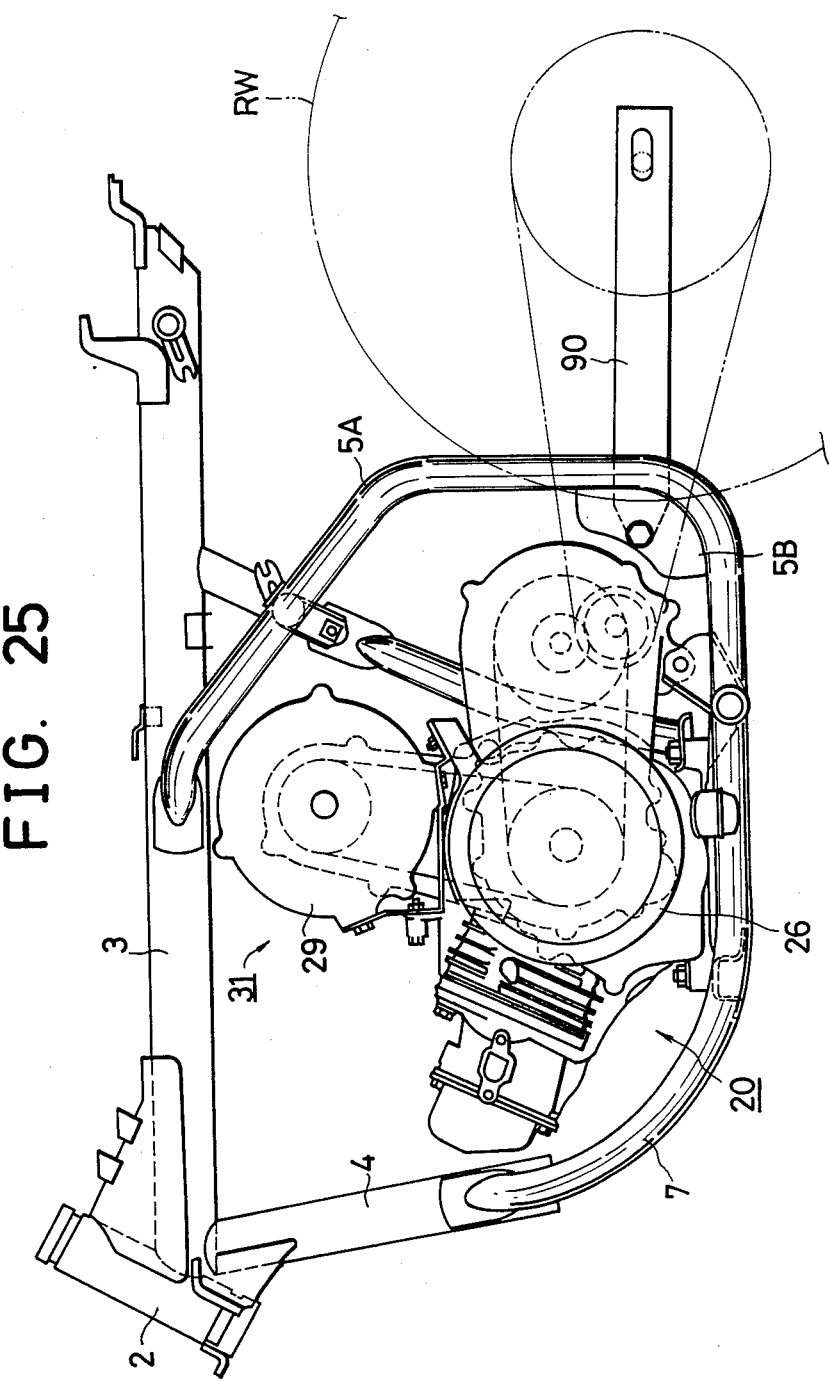
FIG. 25 is a partial side view of a motorcycle according to another embodiment of the present invention.

FIG. 25 illustrates one example of a motorcycle having different frame structure from that of the motorcycle shown in FIG. 1, to which the present invention is applied. In the figure, like numerals denote like or corresponding members with respect to said embodiment.

In this example, the configuration of a rear pipe 5A is different from that of the rear pipe 5. Said rear pipe 5A is provided at its curved corner portion with a gusset 5B. A conventional rear fork 90 is swingably supported by a pivot shaft pivotally supported by said gusset 5B. As in the case with the conventional one, a rear cushion (not shown) is connected at its lower end to the rear portion of said rear fork 90.

In the respective embodiments shown in FIG. 1 and FIG. 25, since the main pipe 3 and the lower half portion of the bottom pipe 7 are formed in parallel with respect to each other, the position of the second dynamo 31 in the forward and backward direction with respect to the engine 20 can be decided with a comparatively large degree of freedom on design.

Also, by arranging the second dynamo 31 integrated with the crank case 21A in a generally central position of the power unit, the vibration balance between the cylinder side of the power unit and the change speed gear side thereof can be improved.

Although the present invention has been described with reference to the preferred embodiments, many modifications and alternations may be made within the spirit of the present invention.

What is claimed is:

1. In a motorcycle equipped with an engine having a first built-in dynamo, said motorcycle including:
   a second dynamo in addition to said first dynamo, said second dynamo being outside of said engine;
   a driven shaft connected to a rotor shaft of said second dynamo;
   a driven rotary member relatively rotatably mounted on said driven shaft;
   a driving rotary member in said engine and adapted to drive said driven rotary member;
   a connecting member mounted on said driven shaft in such a manner as to be slidable in the axial direction thereof and rotatable therewith, said connecting member being adapted to be engaged with and disengaged from said driven rotary member; and
   an actuating member connected to said connecting member through a bearing, said actuating member being displacable in the axial direction of said driven shaft but unrotatable, said connecting member being engaged with or disengaged from said driven rotary member in accordance with the displacement of said actuating member in said axial direction.

2. A motorcycle as claimed in claim 1, wherein:
   said second dynamo is supported by an extending portion of a crank case of said engine;
   a belt transmission device is interposed between said driving rotary member mounted on the crankshaft of said engine and said driven rotary member;
   a cover having an air inlet port is adapted to cover said belt transmission device and mounted to said crank case and;
   a cooling fan is mounted to said rotor shaft of said second dynamo;
   thereby said belt transmission device being cooled by air forced to flow from said air inlet port into said second dynamo.

3. A motorcycle as claimed in claim 1, wherein a socket adapted to take off the output of said second dynamo is arranged at the vehicle body.

4. A motorcycle as claimed in claim 1 further including a body frame having a main frame and a lower frame extending in a generally parallel relation with respect to each other, said second dynamo being installed in a space formed above said engine supported by said lower frame and under said main frame.

* * * * *